(12) United States Patent
Kimura et al.

(10) Patent No.: US 10,907,684 B2
(45) Date of Patent: Feb. 2, 2021

(54) SLIDING PART

(71) Applicant: EAGLE INDUSTRY CO., LTD., Tokyo (JP)

(72) Inventors: Wataru Kimura, Tokyo (JP); Yuichiro Tokunaga, Tokyo (JP); Hideyuki Inoue, Tokyo (JP); Tetsuya Iguchi, Tokyo (JP); Hidetoshi Kasahara, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/638,435

(22) PCT Filed: Aug. 24, 2018

(86) PCT No.: PCT/JP2018/031258
§ 371 (c)(1),
(2) Date: Feb. 11, 2020

(87) PCT Pub. No.: WO2019/044671
PCT Pub. Date: Mar. 7, 2019

(65) Prior Publication Data
US 2020/0182299 A1 Jun. 11, 2020

(30) Foreign Application Priority Data
Aug. 28, 2017 (JP) .................. 2017-163189

(51) Int. Cl.
*F16C 33/10* (2006.01)
*F16C 17/02* (2006.01)
(Continued)

(52) U.S. Cl.
CPC .......... *F16C 33/107* (2013.01); *F16C 17/026* (2013.01); *F16C 17/045* (2013.01);
(Continued)

(58) Field of Classification Search
CPC .... F16C 17/026; F16C 17/045; F16C 33/107; F16C 2360/24; F16J 15/3416; F16J 15/342
See application file for complete search history.

(56) References Cited

U.S. PATENT DOCUMENTS 3,804,424 A * 4/1974 Gardner ................. F16J 15/342
277/360
4,447,063 A * 5/1984 Kotzur ................. F16J 15/3444
277/304

(Continued)

FOREIGN PATENT DOCUMENTS

| JP | S60191766 U | 12/1985 |
|---|---|---|
| JP | S6231775 A | 2/1987 |

(Continued)

OTHER PUBLICATIONS

International Search Report (ISR) dated Oct. 30, 2018, issued for International application No. PCT/JP2018/031258. (1 page).

*Primary Examiner* — Phillip A Johnson
(74) *Attorney, Agent, or Firm* — Law Office of Katsuhiro Arai

(57) ABSTRACT

In a pair of sliding parts having sliding faces S that slide with respect to each other, at least one of the sliding faces S has a one-side peripheral edge (4a) and an other-side peripheral edge (4b) and includes: fluid introduction grooves (12) each of which has one end communicating with the other-side peripheral edge (4b), dynamic pressure generation grooves (11) each of which has one end communicating with the other-side peripheral edge (4b) and the other end being surrounded by a land portion, and a release groove (13) provided in the land portion, the release groove (13) communicating with the fluid introduction grooves (12). With the sliding parts, not only a liquid such as oil but also an oil (Continued)

mist serving as a mixture of oil and air can be sealed as a sealed fluid, and generation of oil mist itself can be reduced.

20 Claims, 8 Drawing Sheets

(51) Int. Cl.
    *F16C 17/04*         (2006.01)
    *F16J 15/34*         (2006.01)

(52) U.S. Cl.
    CPC ...... *F16C 2240/40* (2013.01); *F16C 2370/12* (2013.01); *F16J 15/342* (2013.01)

(56) References Cited

U.S. PATENT DOCUMENTS

| | | | |
|---|---|---|---|
| 2008/0181546 A1* | 7/2008 | Simon | F01D 3/04 384/123 |
| 2013/0209011 A1 | 8/2013 | Tokunaga | |
| 2015/0226334 A1* | 8/2015 | Itadani | F16J 15/3424 277/400 |
| 2015/0377297 A1* | 12/2015 | Tokunaga | F16J 15/3416 384/119 |
| 2018/0073394 A1 | 3/2018 | Tokunaga et al. | |

FOREIGN PATENT DOCUMENTS

| | | |
|---|---|---|
| JP | S62117360 U | 7/1987 |
| JP | H02275182 A | 11/1990 |
| JP | H0646071 B2 | 6/1994 |
| JP | 2001012610 A | 1/2001 |
| JP | 5693599 B2 | 4/2015 |
| WO | 2016167262 A1 | 10/2016 |

* cited by examiner

FIG. 3
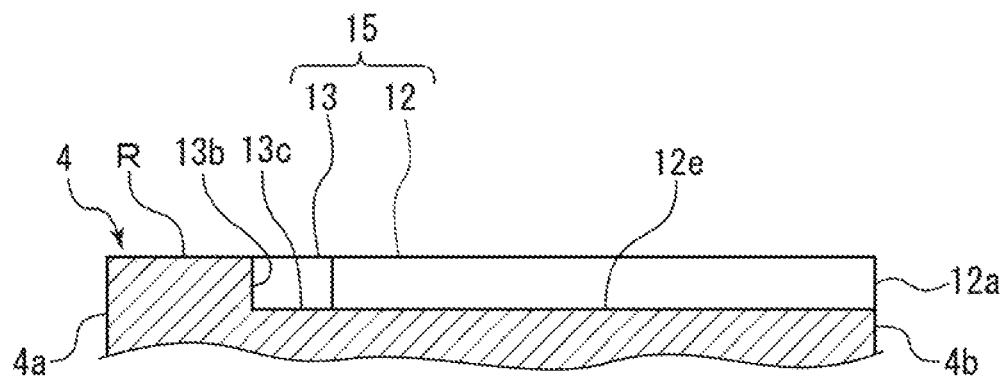
SECTION A-A
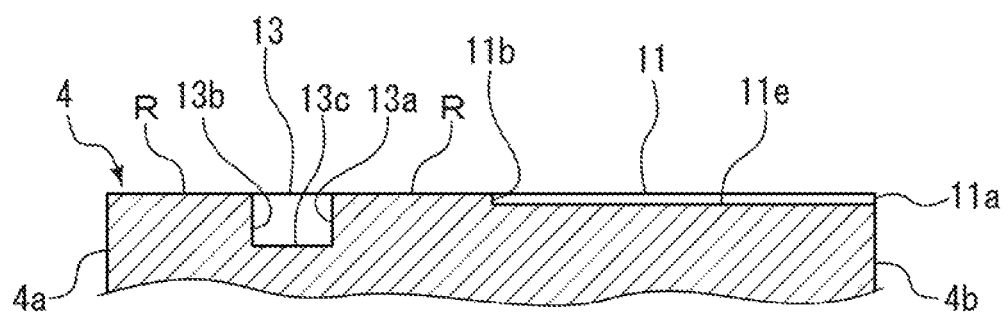
SECTION B-B
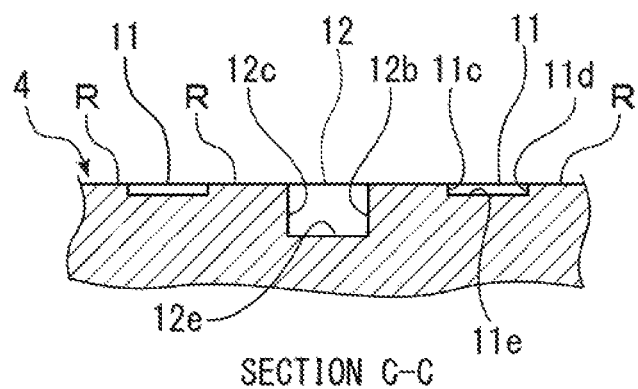
SECTION C-C

SLIDING PART

CROSS-REFERENCE TO RELATED APPLICATIONS

This application is the U.S. National Phase under 35 U.S.C. § 371 of International Application PCT/JP2018/031258, filed Aug. 24, 2018, which claims priority to Japanese Patent Application No. JP2017-163189, filed Aug. 28, 2017. The International Application was published under PCT Article 21(2) in a language other than English.

TECHNICAL FIELD

The present invention relates to a sliding part suitable, for example, as a mechanical seal, a bearing, and other sliding units. In particular, the present invention relates to a sliding part such as a seal ring for reducing friction by interposing a fluid between sliding faces and preventing leakage of the fluid from the sliding faces, for example, a seal to be used for a turbo charger or a gear box for an aircraft engine, or a seal of a bearing.

BACKGROUND ART

A performance of a mechanical seal serving as an example of a sliding part is evaluated based on a leakage amount, a wear amount, and torque. In the conventional art, the performance is enhanced by optimizing the sliding material and roughness of sliding faces of the mechanical seal, so that low leakage, long life, and low torque are realized. However, due to increasing awareness of environmental problems in recent years, further improvement in the performance of the mechanical seal is required, and there is a need for technological development exceeding the framework of the conventional art.

For example, for utilization as an oil seal device for a rotating component such as a turbo charger, there is a known oil seal device including a rotating shaft rotatably accommodated in a housing, a disc-shaped rotating body to be rotated together with the rotating shaft, and a disc-shaped stationary body fixed to the housing, the stationary body to be abutted with an end surface of the rotating body to prevent leakage of oil from the outer peripheral side to the inner peripheral side, wherein an annular groove where positive pressure is generated by centrifugal force of a fluid is provided on an abutment surface of the stationary body, so that leakage of the oil from the outer peripheral side to the inner peripheral side is prevented (for example, see Patent Document 1).

For example, there is a known sealing device of a rotating shaft, the sealing device that seals a poisonous fluid, including a rotating ring to be rotated together with the rotating shaft, and a stationary ring attached to a casing, wherein a sliding face of any of the rotating ring and the stationary ring is provided with spiral grooves open on the low pressure side of the sliding face, the grooves having end portions on the high pressure side which are dead-ends, and the fluid is fed from the low pressure side to the high pressure side through the spiral grooves by rotation, so that leakage of the sealed fluid on the high pressure side to the low pressure side is prevented (for example, see Patent Document 2).

Further, for example, there is a known seal structure for a driving shaft of a turbo charger, wherein a pair of seal rings one of which is provided in a rotating constituent element and the other is provided in a stationary constituent element, the seal rings have seal surfaces formed substantially in the radial direction in operation, a seal gap for sealing an outside section of the seal surfaces from an inside section of the seal surfaces is formed between the seal surfaces, plural recessed portions separated from each other in the circumferential direction for feeding in a gas are provided at least one of the seal surfaces, the recessed portions extend from one-side peripheral edge of the seal surfaces toward other-side peripheral edge, and inner ends of the recessed portions are provided to be separated in the radial direction from the other-side peripheral edge of the seal surfaces, so that a non-gas component in a gas medium containing the non-gas component is sealed (for example, see Patent Document 3).

For example, there is a known seal structure for a driving shaft of a turbo charger, wherein spiral dynamic pressure generation grooves are provided on a sliding face of a rotating side seal ring, fluid introduction grooves formed to be deeper than the dynamic pressure generation grooves are provided on the outside of the dynamic pressure generation grooves, a sealed fluid is actively introduced to the fluid introduction grooves, and the fluid is supplied to the sliding face, so that the sliding face is lubricated in a low-speed rotation state at the time of start-up, etc. (for example, see Patent Document 4).

CITATION LIST

Patent Documents

Patent Document 1: JP 62-117360 U
Patent Document 2: JP 62-31775 A
Patent Document 3: JP 2001-12610 A
Patent Document 4: WO2016/167262

SUMMARY OF THE INVENTION

Technical Problem

However, when the conventional art described in Patent Documents 1 to 4 described above is applied to a high-speed rotating device such as a turbo charger, the high-pressure air generated by positive pressure generation mechanisms such as the spiral grooves is excessively fed from the leakage side to the sealed fluid side, and a large amount of an oil mist serving as a mixture of the air and oil is generated in a space on the sealed fluid side. As a result, although the liquid oil can be sealed as the sealed fluid, there is a fear that the oil mist may leak out or a large amount of the oil mist generated on the sealed fluid side may have a harmful influence on a lubrication system.

The present invention is achieved focusing on such problems, and an object of the present invention is to provide sliding parts with which not only a liquid such as oil but also an oil mist serving as a mixture of the oil and the air can be sealed as a sealed fluid, and generation of the oil mist itself can be reduced, so that it is possible to further reduce a sliding loss.

Solution to Problem

In order to attain the above object, sliding parts according to a first aspect of the present invention are a pair of sliding parts having sliding faces that slide with respect to each other, characterized in that at least the sliding face on one side includes fluid introduction grooves each of which has one end communicating with an other-side peripheral edge of the sliding face, dynamic pressure generation grooves each of which has one end communicating with the other-side peripheral edge of the sliding face and the other end being surrounded by a land portion, and a release groove provided in the land portion, the release groove communicating with the fluid introduction grooves.

According to the first aspect, by dynamic pressure generated by the dynamic pressure generation grooves, it is possible to push and spread a portion between the sliding faces and perform lubrication with a fluid. Thus, it is possible to extremely reduce friction resistance due to sliding. In addition, the dynamic pressure generated by the dynamic pressure generation grooves is released to the other-side peripheral edge side via the release groove. Thus, it is possible to suppress excessive pumping and reduce generation of an oil mist.

The sliding parts according to a second aspect of the present invention are characterized in that the release groove is provided between the other ends of the dynamic pressure generation grooves and a one-side peripheral edge of the sliding face.

According to the second aspect, the dynamic pressure generated by the dynamic pressure generation grooves is released to the leakage side by the release groove provided between the other ends of the dynamic pressure generation grooves and the one-side peripheral edge of the sliding face. Thus, the dynamic pressure generated by the dynamic pressure generation grooves is not excessively pumped to the one-side peripheral edge of the sliding face. Therefore, it is possible to reduce the generation of the oil mist.

The sliding parts according to an aspect of the present invention are characterized by including regions where one or more dynamic pressure generation grooves are surrounded by the release flow passage and the leakage side peripheral edge, characterized in that two or more regions are provided in the sliding face.

According to the aspect, by adjusting the dynamic pressure generation grooves arranged in the regions surrounded by the release flow passage and the leakage side peripheral edge, it is possible to adjust strength of an oil mist suppression function.

The sliding parts according to a third aspect of the present invention are characterized in that the sliding face includes regions surrounded by the fluid introduction grooves and the release groove, and the predetermined number of the dynamic pressure generation grooves are arranged in the regions.

According to the third aspect, it is possible to adjust the number of the dynamic pressure generation grooves arranged in the regions surrounded by the fluid introduction grooves and the release groove. Thus, it is possible to adjust the number of the release groove and the dynamic pressure generation grooves in a well-balanced manner.

The sliding parts according to a fourth or fifth aspect of the present invention are characterized in that the regions are arranged continuously or non-continuously in the circumferential direction.

According to the fourth or fifth aspect, it is possible to easily adjust a degree of releasing the dynamic pressure generated by the dynamic pressure generation grooves by the release groove.

The sliding parts according to a sixth aspect of the present invention are characterized by further including a dynamic pressure generation mechanism including a fluid introduction portion having one end that communicates with the one-side peripheral edge of the sliding face, and a groove portion having one end that communicates with the fluid introduction portion and a Rayleigh step mechanism in the other end.

According to the sixth aspect, the fluid introduction portion can introduce the fluid on the sealed fluid side and lubricate the sliding face at the time of start-up, and it is possible to push and spread the portion between the sliding faces by dynamic pressure generated by the Rayleigh step mechanism and perform lubrication with the fluid at the time of steady operation. Thus, it is possible to reduce a sliding loss.

The sliding parts according to a seventh aspect of the present invention are characterized by further including a dynamic pressure generation mechanism including a fluid introduction portion having a pair of opening portions open at the one-side peripheral edge of the sliding face and a communication passage providing communication between the pair of opening portions, and a groove portion having one end that communicates with the fluid introduction portion and a Rayleigh step mechanism in the other end.

According to the seventh aspect, it is possible to always supply a new fluid to the sliding face by the fluid introduction portion having the communication passage that provides communication between the pair of opening portions. Thus, it is possible to discharge foreign substances and reliably lubricate the sliding face.

The sliding parts according to an eighth aspect of the present invention are characterized in that the dynamic pressure generation mechanism is provided between the release groove and the one-side peripheral edge of the sliding face.

According to the eighth aspect, even when the dynamic pressure generated by the dynamic pressure generation grooves is released to the other-side peripheral edge side via the release groove, it is possible to reliably lubricate the sliding face by dynamic pressure generated by the dynamic pressure generation mechanism which is provided between the release groove and the one-side peripheral edge of the sliding face.

BRIEF DESCRIPTION OF THE DRAWINGS

FIGS. 3A to 3C are sectional views of portions in FIG. 2.

DESCRIPTION OF EMBODIMENTS

Modes for carrying out sliding parts according to the present invention will be described in detail with reference to the drawings. In the present embodiments, a case where parts forming a mechanical seal are sliding parts will be described as an example. However, the present invention is not interpreted while being limited to this. As long as not departing from the scope of the present invention, various changes, corrections, and improvements can be added based on the knowledge of those skilled in the art.

First Embodiment

Sliding parts according to a first embodiment of the present invention will be described with reference to FIGS. 1 to 3.

Figure 1:
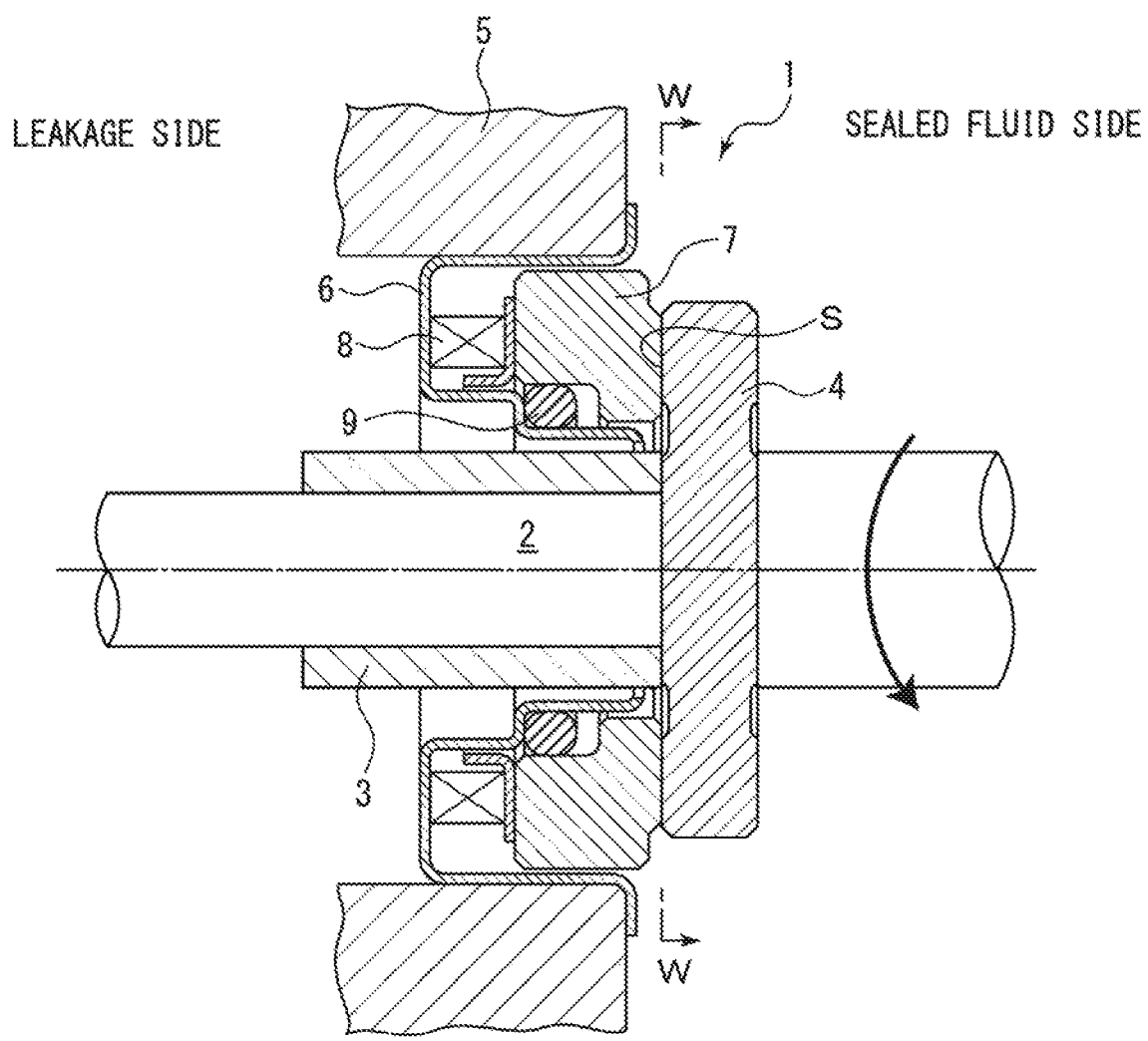
FIG. 1 is a vertically sectional view showing a sliding part in a first embodiment.

FIG. 1 is a vertically sectional view showing an example of a mechanical seal, which is an inside mechanical seal in the form of sealing a sealed fluid to leak from the outer periphery of sliding faces toward the inner periphery. The mechanical seal is provided with a ring-shaped rotating side seal ring 4 serving as one sliding part provided across a sleeve 3 on the side of a rotating shaft 2 in a state where the rotating side seal ring is rotatable integrally with this rotating shaft 2, and a ring-shaped stationary side seal ring 7 serving as the other sliding part provided in a housing 5 via a cartridge 6 in a non-rotation state and an axially movable state. With a coiled wave spring 8 axially biasing the stationary side seal ring 7, the seal rings slide in close contact with each other at sliding faces S. That is, in this mechanical seal, the rotating side seal ring 4 and the stationary side seal ring 7 have the sliding faces S formed in the radial direction, and an outflow of the sealed fluid such as a liquid or a mist-shaped liquid from the outer periphery of the sliding faces S to the leakage side of the inner peripheral side is prevented at the sliding faces S of the seal rings. The reference sign 9 denotes an O ring that seals a portion between the cartridge 6 and the stationary side seal ring 7.

The material of the rotating side seal ring 4 and the stationary side seal ring 7 is selected from silicon carbide (SiC) excellent in wear resistance, carbon excellent in self-lubricity, etc. For example, both the seal rings can be made of SiC, or any one of the seal rings made of SiC and the other made of carbon can be combined.

Figure 2:
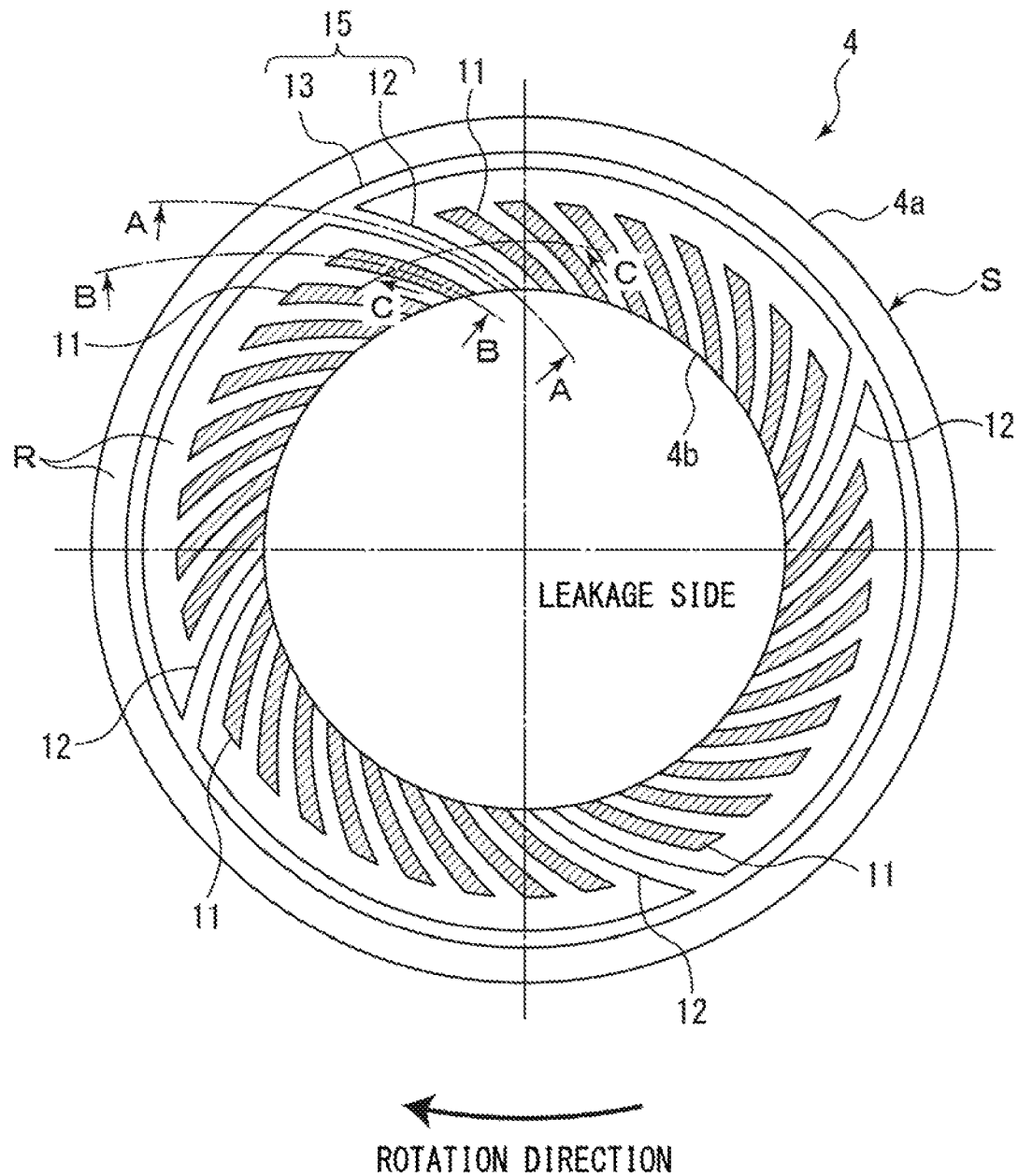
FIG. 2 is a W-W arrow view of FIG. 1, the view showing a sliding face of the sliding part according to the first embodiment of the present invention.

FIG. 2 is a W-W arrow view of FIG. 1, showing the sliding face S of the rotating side seal ring 4. The outer peripheral side of the sliding face S of the rotating side seal ring 4 is the sealed fluid side (one side of the sliding face), and the inner peripheral side is the leakage side (other side of the sliding face). A case where the rotating side seal ring 4 is rotated clockwise as shown by an arrow will be described. The sealed fluid side is filled with a liquid such as oil, a gas, or a mixture (oil mist) of the liquid such as the oil and the gas. The leakage side is filled with a gas such as the air.

The sliding face S of the rotating side seal ring 4 includes plural dynamic pressure generation grooves 11 provided over the entire circumference of the sliding face S, and a release flow passage 15 surrounding the plural dynamic pressure generation grooves 11, the release flow passage that releases to a leakage side peripheral edge 4b (other-side peripheral edge of the sliding face according to the present invention).

As shown in FIGS. 2 and 3, the dynamic pressure generation grooves 11 are extremely shallow band-shaped grooves provided in land portion R and set in a spiral form. Each of the dynamic pressure generation grooves has an opening portion 11a open at the leakage side peripheral edge 4b. The dynamic pressure generation groove 11 is a groove having a bottom portion wall 11e, and a pair of radial walls 11c, 11d standing on the bottom portion wall 11e, the groove extending in the radial direction with the sliding face S side being open. One end of the dynamic pressure generation groove 11 communicates with the leakage side through the opening portion 11a, and a dead end portion 11b of the other end is surrounded and closed by the land portion.

In a rotation state, the dynamic pressure generation groove 11 suctions the fluid (gas) on the leakage side from the opening portion 11a, pressure is boosted toward the outer periphery, and the fluid is dammed at the dead end portion 11b, so that high dynamic pressure (positive pressure) is generated. By this dynamic pressure, a slight gap is formed between the sliding faces S of the rotating side seal ring 4 and the stationary side seal ring 7. The sliding faces S are brought into a gas lubricating state, and friction resistance due to sliding becomes extremely small. At the same time, the gas on the leakage side suctioned from the opening portion 11a of the dynamic pressure generation groove 11 is pumped toward the sealed fluid side. Thus, leakage of the liquid on the outer peripheral side to the inner peripheral side is prevented. The spiral-form dynamic pressure generation grooves 11 are isolated from the sealed fluid side by the land portion R. Thus, no leakage is generated at the rest time.

As shown in FIGS. 2 and 3, the sectional area of the release flow passage 15 is formed to be sufficiently larger than the sectional area of the dynamic pressure generation grooves 11. The release flow passage 15 is mainly formed by an annular release groove 13 provided in the land portion R, and fluid introduction grooves 12 each of which has one end communicating with the leakage side peripheral edge 4b through a communication portion 12a open at the leakage side peripheral edge 4b, and the other end communicating with the release groove 13. The release flow passage 15 formed by the release groove 13 and the fluid introduction grooves 12 is provided and separated from the dynamic pressure generation grooves 11 by the land portion R. The release groove 13 is a ring-shaped groove having a bottom portion wall 13c, and a pair of peripheral walls 13a, 13b standing on the bottom portion wall 13c with the sliding face S side being open. The sliding face S is divided into a sealed side land portion R and a leakage side land portion R by the release groove 13. Each of the fluid introduction grooves 12 is a groove having a bottom portion wall 12e, and a pair of radial walls 12b, 12c standing on the bottom portion wall 12e, and extending in the radial direction with the sliding face S side being open. By the one ends of the fluid introduction grooves 12 communicating with the release groove 13 and the other ends communicating with the leakage side through the communication portions 12a, the entire release flow passage 15 communicates with the leakage side.

As shown in FIG. 2, a portion between the release groove 13 and the leakage side peripheral edge 4b is divided into the predetermined number of (four in the example of FIG. 2) sections by the predetermined number of the fluid introduction grooves 12. The predetermined number of (eight in the example of FIG. 2) the dynamic pressure generation grooves 11 are arranged in each of the sections. By being arranged in a region surrounded by the release flow passage 15 and the leakage side peripheral edge 4b, the dynamic pressure generation grooves 11 are isolated from the sealed fluid side. Thereby, even when high dynamic pressure is generated by the dynamic pressure generation grooves 11, high dynamic pressure is released to the leakage side by the release flow passage 15, and excessive pumping from the leakage side to the sealed fluid side by the dynamic pressure generation grooves 11 is restricted. Thus, it is possible to prevent excessive supply of the gas from the leakage side to the sealed fluid side. In FIG. 2, the sliding face S is divided into four sections by four fluid introduction grooves 12. However, as long as dynamic pressure generated by the dynamic pressure generation grooves 11 can be released, the number of the fluid introduction grooves 12 can be decided with a natural number which is one or more. The number of the dynamic pressure generation grooves 11 arranged in regions partitioned by the fluid introduction grooves 12 is not limited to eight of FIG. 2 but can be decided with a natural number which is one or more.

Each of the dynamic pressure generation grooves 11 has the flow passage sectional area S11 partitioned by the bottom portion wall 11e, the pair of radial walls 11c, 11d standing on the bottom portion wall 11e, and the land portion R, and the sum St11 of the flow passage sectional areas of the dynamic pressure generation grooves 11 is St11=S11× number of dynamic pressure generation grooves 11. The release groove 13 has the flow passage sectional area S13 partitioned by the bottom portion wall 13c, the pair of peripheral walls 13a, 13b standing on the bottom portion wall 13c, and the land portion R. Each of the fluid introduction grooves 12 has the flow passage sectional area S12 partitioned by the bottom portion wall 12e, the pair of radial walls 12b, 12c standing on the bottom portion wall 12e, and the land portion R. The flow passage sectional area S13 of the release groove 13 and the flow passage sectional areas S12 of the fluid introduction grooves 12 are respectively formed to be larger than the sum St11 of the flow passage sectional areas S11 of the dynamic pressure generation grooves 11. Thereby, a high-pressure gas pumped by the dynamic pressure generation grooves 11 is reliably reduced by the release flow passage 15, and easily discharged to the leakage side. Thus, excessive pumping from the leakage side to the sealed fluid side is restricted, and hence, it is possible to prevent excessive supply of the gas from the leakage side to the sealed fluid side.

According to the configuration of the first embodiment described above, the following effects are exerted. By high dynamic pressure generated by the dynamic pressure generation grooves 11, the slight gap is formed between the sliding faces S of the rotating side seal ring 4 and the stationary side seal ring 7. The sliding faces S are brought into a gas lubricating state, and it is possible to highly lower sliding friction and reduce wear of the sliding faces. At the same time, the gas on the leakage side is pumped from the leakage side to the sealed fluid side by the dynamic pressure generation grooves 11. Thus, it is possible to prevent leakage of the sealed liquid on the outer peripheral side to the leakage side of the inner peripheral side. The dynamic pressure generation grooves 11 are isolated from the sealed fluid side by the land portion R. Thus, no leakage is generated at the rest time.

The dynamic pressure generation grooves 11 are surrounded by the release flow passage 15 and the leakage side peripheral edge 4b, and isolated from the sealed side land portion R. Thus, high dynamic pressure generated by the dynamic pressure generation grooves 11 is released to the leakage side by the release flow passage 15, and excessive pumping from the leakage side to the sealed fluid side by the dynamic pressure generation grooves 11 is restricted. Thereby, it is possible to prevent excessive supply of the gas from the leakage side to the sealed fluid side. Thus, it is possible to prevent generation of a large amount of the oil mist.

In the embodiment described above, the release groove 13 provided in the land portion R is formed in a ring shape but not limited to the ring shape. For example, by providing communication between the fluid introduction grooves 12 by a straight-line-shaped, polygonal-line-shaped, or curved release groove 13, so that the release groove may be formed in a polygonal loop.

Second Embodiment

Next, sliding parts according to a second embodiment will be described with reference to FIGS. 1 and 4. In the sliding parts according to the first embodiment, all the plural dynamic pressure generation grooves 11 are surrounded by the release flow passage 15 and the leakage side peripheral edge 4b. Meanwhile, the sliding parts according to the second embodiment are different in a point that one or more dynamic pressure generation grooves 11 are surrounded by release flow passages 25 and a leakage side peripheral edge 4b. However, the other basic configurations are the same as the first embodiment. The same members will be given the same reference signs and duplicated description will be omitted.

A sliding face S of a rotating side seal ring 4 has the plural dynamic pressure generation grooves 11 arranged over the entire circumference of the sliding face S, and includes first groove groups 21 in which the plural dynamic pressure generation grooves 11 are arranged on the inside of the release flow passages 25, and second groove groups 22 in which the plural dynamic pressure generation grooves 11 are arranged between a sealed fluid side peripheral edge 4a (one-side peripheral edge of the sliding face according to the present invention) and the leakage side peripheral edge 4b (other-side peripheral edge of the sliding face according to the present invention). The two first groove groups 21 and the two second groove groups 22 are arranged to oppose each other.

Figure 4:
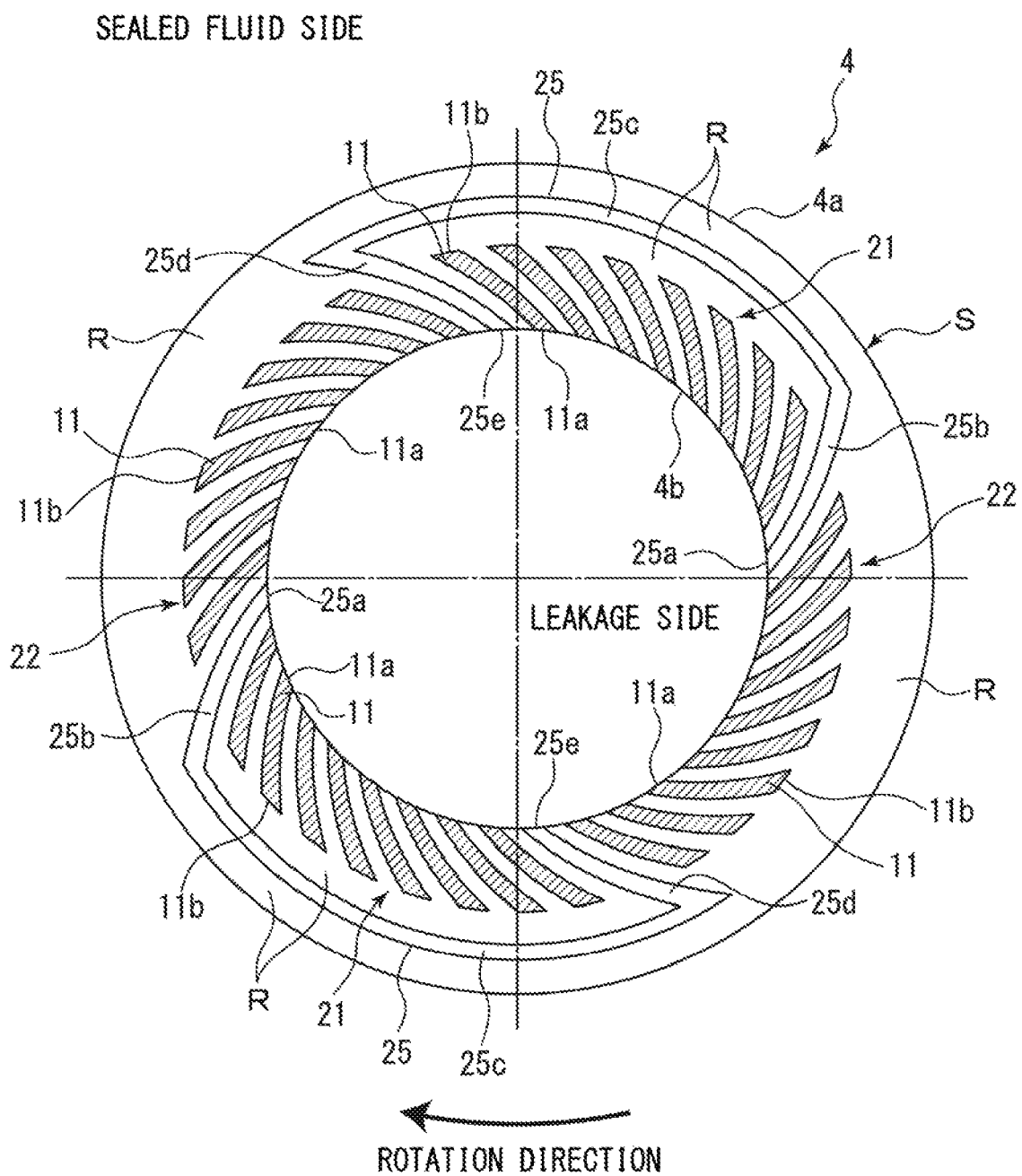
FIG. 4 is a W-W arrow view of FIG. 1, the view showing a sliding face of a sliding part according to a second embodiment of the present invention.

As shown in FIGS. 1 and 4, each of the release flow passages 25 includes an arc-shaped release groove 25c arranged in a land portion R, the release groove extending in the circumferential direction, and fluid introduction grooves 25b, 25d communicating with the release groove 25c and extending in the radial direction. One ends of the fluid introduction grooves 25b, 25d respectively communicate with the leakage side peripheral edge 4b through opening portions 25a, 25e, and the other ends respectively communicate with end portions of the release groove 25c. Each of the first groove groups 21 is formed by arranging the plural (eight in the example of FIG. 4) dynamic pressure generation grooves 11 on the inside of the release flow passage 25 and separated from the sealed fluid side by the release flow passage 25.

Each of the second groove groups 22 is formed by arranging the plural (eight in the example of FIG. 4) dynamic pressure generation grooves 11 on the outside of the release flow passage 25. The first groove groups 21 and the second groove groups 22 are alternately arranged in the circumferential direction on the sliding face S. In FIG. 4, the two first groove groups 21 and the two second groove groups 22 are arranged. However, the present invention is not limited to this. For example, one first groove group 21 and one second groove group 22 may be arranged, or three or more first groove groups and three or more second groove groups may be arranged. Although the first groove groups 21 and the second groove groups 22 are alternately arranged, two or more first groove groups 21 may be arranged continuously, or two or more second groove groups 22 may be arranged continuously so that the first groove groups 21 are arranged non-continuously.

The sliding parts according to the second embodiment described above exert the following operations and effects. By high dynamic pressure generated by the first groove groups 21 and the second groove groups 22 by high-speed rotation, a slight gap is formed between the sliding faces of the rotating side seal ring 4 and a stationary side seal ring 7. The sliding faces S are brought into a gas lubricating state, and it is possible to highly lower sliding friction and reduce wear of the sliding faces. At the same time, a gas on the leakage side is pumped from the leakage side to the sealed fluid side by the first groove groups 21 and the second groove groups 22. Thus, it is possible to prevent leakage of a sealed fluid on the outer peripheral side to the leakage side of the inner peripheral side. The first groove groups 21 and the second groove groups 22 are isolated from the sealed fluid side by the land portion R. Thus, no leakage is generated at the rest time.

The first groove groups 21 are isolated from the sealed fluid side by being arranged in regions surrounded by the release flow passages 25 and the leakage side peripheral edge 4b. Thus, high dynamic pressure generated by the first groove groups 21 is released to the leakage side by the release flow passages 25, and supply of the gas from the leakage side to the sealed fluid side is restricted. That is, the first groove groups 21 are excellent in an oil mist suppressing function. Meanwhile, the second groove groups 22 are surrounded only by the land portion R. Thus, the sealed fluid is actively pumped from the second groove groups 22 to the sealed fluid side, and it is possible to actively prevent leakage of the sealed fluid to the leakage side. That is, the second groove groups 22 are excellent in a sealing function.

In the sliding parts of the first embodiment, all the plural dynamic pressure generation grooves 11 are surrounded by the release flow passage 15, and high dynamic pressure generated by all the dynamic pressure generation grooves 11 is released to the leakage side by the release flow passage 15. Thus, there is sometimes a case where the amount of the gas pumped from the leakage side to the sealed fluid side is insufficient, and the sealing function is lowered. Meanwhile, in the sliding parts of the second embodiment, a ratio between the first groove groups 21 excellent in the oil mist suppressing function and the second groove groups 22 excellent in the sealing function can be adjusted. Thus, it is possible to enhance the sealing function by making a pumping function dominant with respect to the oil mist suppressing function, or on the other hand, it is possible to reduce generation of an oil mist by making the oil mist suppressing function dominant with respect to the pumping function.

In the embodiment described above, the eight dynamic pressure generation grooves 11 are arranged in a region surrounded by the release flow passage 25 and the leakage side peripheral edge 4b. However, the number of the dynamic pressure generation grooves 11 arranged in the region is not limited to this. For example, one dynamic pressure generation groove 11 may be arranged in the region, or nine or more natural number of dynamic pressure generation grooves 11 may be arranged in the region. In a case where one dynamic pressure generation groove 11 is arranged in the region, length of the release groove 25c may be zero and the fluid introduction grooves 25b, 25d may be directly connected, so that end portions of the fluid introduction grooves 25b, 25d are respectively open at the leakage side peripheral edge 4b.

Third Embodiment

Figure 7:
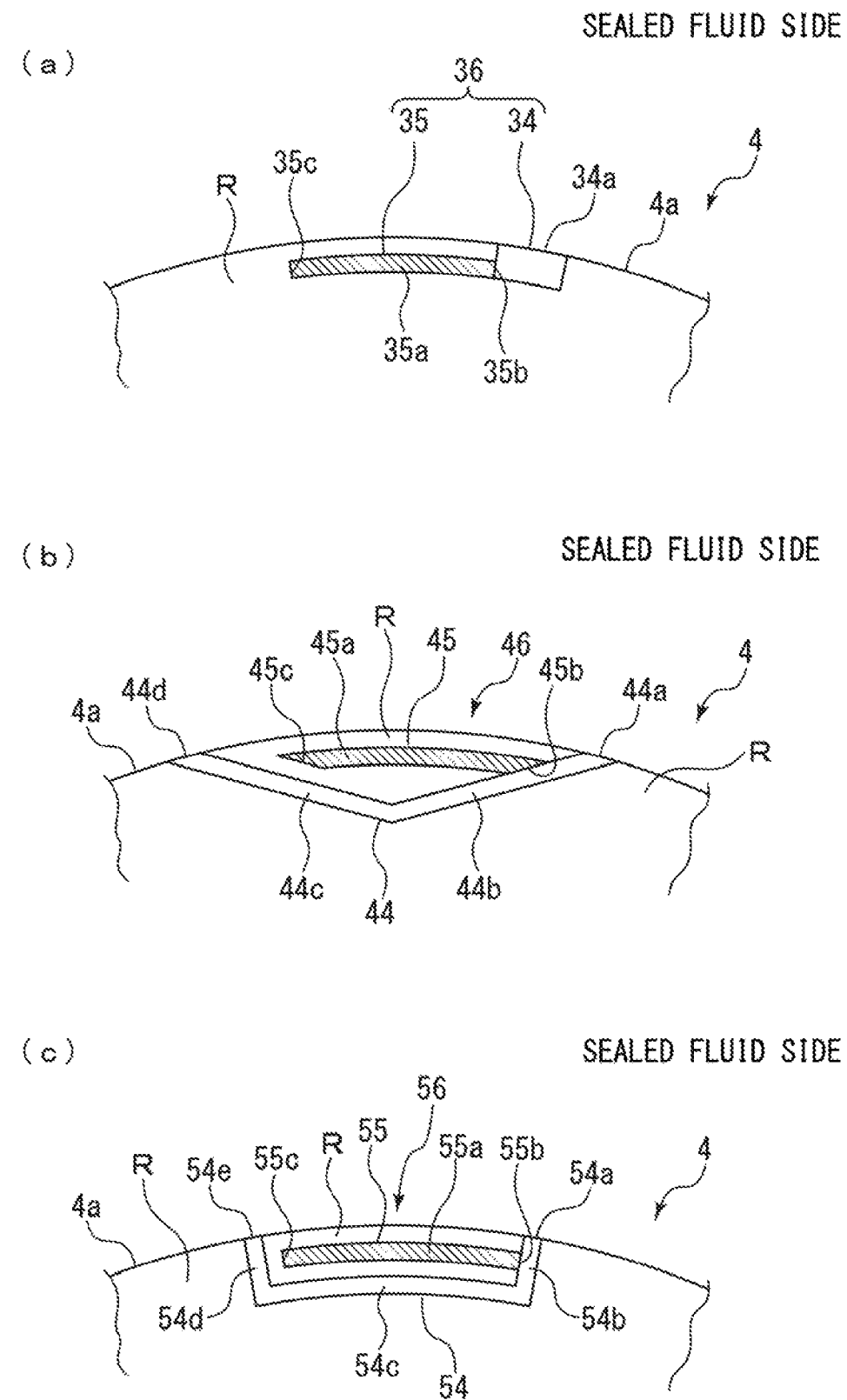
FIG. 7A is a view showing a dynamic pressure generation mechanism.
FIG. 7B is a view showing a modified example of the dynamic pressure generation mechanism.
FIG. 7C is a view showing another modified example of the dynamic pressure generation mechanism.

Next, sliding parts according to a third embodiment will be described with reference to FIGS. 1, 5, and 7. The sliding parts according to the third embodiment are different from the sliding parts according to the first embodiment in a point that dynamic pressure generation mechanisms 36 are provided on the sealed fluid side of sliding faces S. However, the other basic configurations are the same as the first embodiment. The same members as the first embodiment will be given the same reference signs and duplicated description will be omitted.

In the sliding parts of the first embodiment, all the plural dynamic pressure generation grooves 11 are surrounded by the release flow passage 15, and high dynamic pressure generated by all the dynamic pressure generation grooves 11 is released to the leakage side by the release flow passage 15. Therefore, there is sometimes a case where a lubricating function is insufficient in a region on the outside of the release flow passage 15, or in a low-speed rotation state of the rotating side seal ring 4 at the time of start-up, etc., dynamic pressure for maintaining the sliding faces S of the rotating side seal ring 4 and the stationary side seal ring 7 in a gas lubricating state is insufficient. Thus, in the sliding parts according to the third embodiment, the plural dynamic pressure generation mechanisms 36 are provided in a land portion R on the sealed fluid side, the sliding faces S are maintained in a fluid lubricating state, so that an a friction loss due to sliding is reduced.

Figure 5:
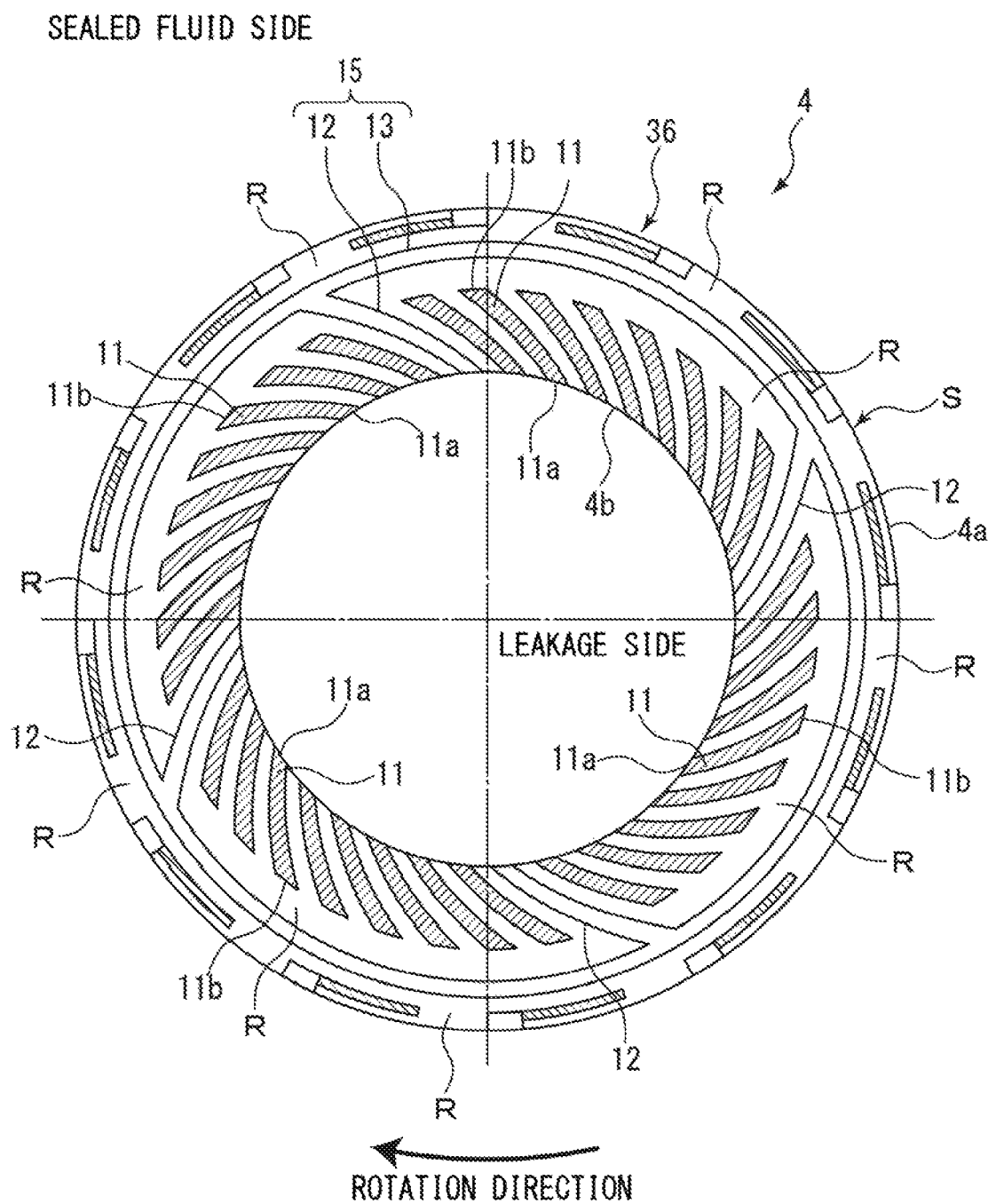
FIG. 5 is a W-W arrow view of FIG. 1, the view showing a sliding face of a sliding part according to a third embodiment of the present invention.

As shown in FIG. 5, the sliding face S of a rotating side seal ring 4 includes plural dynamic pressure generation grooves 11 provided over the entire circumference of the sliding face S, a release flow passage 15 surrounding the plural dynamic pressure generation grooves 11, and the dynamic pressure generation mechanisms 36 in the land portion R between the release flow passage 15 and a sealed fluid side peripheral edge 4a.

As shown in FIG. 7A, each of the dynamic pressure generation mechanisms 36 is mainly formed by a fluid introduction portion 34 open on the sealed fluid side of the sliding face S, and an extremely shallow groove 35 (groove portion according to the present invention) communicating with the fluid introduction portion 34 and forming a Rayleigh step mechanism. With the fluid introduction portion 34, only the sealed fluid side peripheral edge 4a is open by a sealed fluid side opening portion 34a, and the sectional area of the fluid introduction portion 34 is formed to be sufficiently larger than the sectional area of the extremely shallow groove 35. The extremely shallow groove 35 is a band-shaped groove extending in the circumferential direction, and has an opening portion 35b communicating with the fluid introduction portion 34 in one end on the upstream side of the extremely shallow groove 35, and a dead-end portion 35c whose peripheral edge is surrounded by the land portion R in the other end. When rotated in the rotation direction shown in FIG. 5, the dead-end portion 35c of the extremely shallow groove 35 functions as the Rayleigh step mechanism that generates positive pressure.

In the dynamic pressure generation mechanism 36, until the sliding face is brought into a fluid lubricating state at the time of start-up, a fluid flowing into the fluid introduction portion 34 from the sealed fluid side opening portion 34a is supplied to the sliding face. Thus, it is possible to improve a lubricating property even in a region on the outside of the release flow passage 15. In a high-speed rotation state, the extremely shallow groove 35 takes in the fluid from the opening portion 35b, and the intake fluid is dammed by the dead-end portion 35c, so that high dynamic pressure (positive pressure) is generated. Thus, a slight gap is formed between the sliding faces of the rotating side seal ring 4 and the stationary side seal ring 7, and the sliding faces are brought into a fluid lubricating state, so that it is possible to obtain very low friction.

In place of the dynamic pressure generation mechanisms 36 shown in FIG. 7A, dynamic pressure generation mechanisms 46 shown in FIG. 7B may be adopted. Each of the dynamic pressure generation mechanisms 46 is mainly formed by a fluid introduction portion 44 open on the sealed fluid side of the sliding face S, and an extremely shallow groove 45 (groove portion according to the present invention) communicating with the fluid introduction portion 44, the extremely shallow groove being surrounded by the fluid introduction portion 44 via the land portion. The fluid introduction portion 44 includes a pair of sealed fluid side opening portions 44a, 44d open at the one-side peripheral edge 4a of the sliding face, and V-form communication passages 44b, 44c surrounded by the land portion R. The sealed fluid side opening portions 44a, 44d communicate with each other by the communication passages 44b, 44c. The extremely shallow groove 45 is a band-shaped groove extending in the circumferential direction. One end of the groove communicates with the communication passage 44b on the upstream side of the fluid introduction portion 44 by an opening portion 45b, and the other end has a dead-end portion 45c surrounded by the land portion R. When rotated in the rotation direction shown in FIG. 5, the dead-end portion 45c of the extremely shallow groove 45 functions as the Rayleigh step mechanism that generates positive pressure.

The fluid introduction portion 44 takes in the fluid from the sealed fluid side opening portion 44a on one side, and discharges the fluid from the sealed fluid side opening portion 44d on the other side, so that it is possible to circulate the sealed-side fluid through to the sliding face S along the communication passages 44b, 44c. Thereby, a new fluid is always supplied to the sliding face S from the entire surfaces of the communication passages 44b, 44c of the fluid introduction portion 44. Thus, even in a low-speed rotation state at the time of start-up, etc., it is possible to maintain the sliding face S in a fluid lubricating state. The fluid introduction portion 44 takes in the fluid from the sealed fluid side opening portion 44a on one side, and discharges the fluid from the sealed fluid side opening portion 44d on the other side, so that a new fluid is always taken in. Thus, it is possible to discharge foreign substances. Further, at the time of rotation, the extremely shallow groove 45 takes in the fluid from the opening portion 45b, the intake fluid is dammed by the dead-end portion 45c, so that high dynamic pressure (positive pressure) is generated. Thus, a slight gap is formed between the sliding faces of the rotating side seal ring 4 and the stationary side seal ring 7, and the sliding faces are brought into a fluid lubricating state, so that it is possible to obtain very low friction.

In place of the dynamic pressure generation mechanisms 36, 46 shown in FIGS. 7A and 7B, dynamic pressure generation mechanisms 56 shown in FIG. 7C may be adopted. Each of the dynamic pressure generation mechanisms 56 is mainly formed by a fluid introduction portion 54 open on the sealed fluid side of the sliding face S, and an extremely shallow groove 55 (groove portion according to the present invention) communicating with the fluid introduction portion 54, the extremely shallow groove being surrounded by the fluid introduction portion 54. The fluid introduction portion 54 includes a pair of sealed fluid side opening portions 54a, 54e open at the one-side peripheral edge 4a of the sliding face, a circumferential flow passage 54c surrounded by the land portion R, and radial flow passages 54b, 54d respectively communicating with end portions of the circumferential flow passage 54c and extending in the radial direction. The circumferential flow passage 54c and the radial flow passages 54b, 54d communicate with the sealed fluid side by the sealed fluid side opening portions 54a, 54e. The extremely shallow groove 55 includes a band-shaped groove 55a extending in the circumferential direction. One end of the groove communicates with the radial flow passage 54b on the upstream side of the fluid introduction portion 54 by an opening portion 55b, and the other end has a dead-end portion 55c surrounded by the land portion R. When rotated in the rotation direction shown in FIG. 5, the dead-end portion 55c of the extremely shallow groove 55 functions as the Rayleigh step mechanism that generates positive pressure.

With such a configuration, radial size of the fluid introduction portion 54 of FIG. 7C can be smaller than radial size of the fluid introduction portion 44 of FIG. 7B, so that it is possible to make downsizing. In a low-speed rotation state at the time of start-up, etc., the fluid taken in by the fluid introduction portion 54 is actively supplied to the sliding face S, so that it is possible to lubricate the sliding face S. Further, in a high-speed rotation state, in the extremely shallow groove 55, the fluid taken in from the opening portion 55b is dammed by the dead-end portion 55c, so that high dynamic pressure (positive pressure) is generated. Thus, a slight gap is formed between the sliding faces of the rotating side seal ring 4 and the stationary side seal ring 7, and the sliding faces are brought into a fluid lubricating state, so that it is possible to obtain very low friction.

Fourth Embodiment

Figure 6:
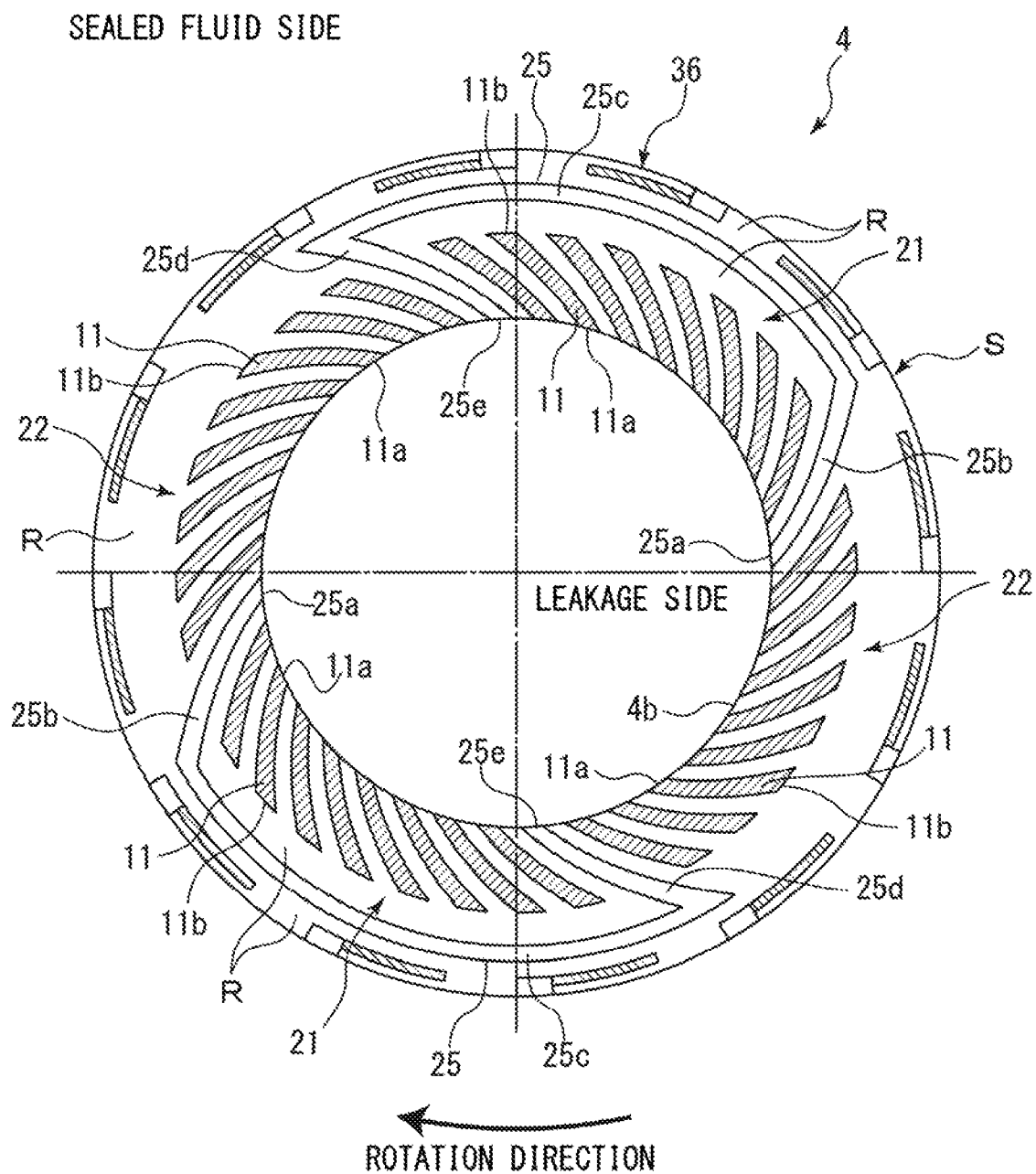
FIG. 6 is a W-W arrow view of FIG. 1, the view showing a sliding face of a sliding part according to a fourth embodiment of the present invention.

Next, sliding parts according to a fourth embodiment will be described with reference to FIGS. 1, 6, and 7. The sliding parts according to the fourth embodiment are different from the sliding parts according to the second embodiment in a point that dynamic pressure generation mechanisms 36 are provided on the sealed fluid side. However, the other basic configurations are the same as the second embodiment. The same members as the second embodiment will be given the same reference signs and duplicated description will be omitted.

Even in the sliding parts according to the second embodiment, in a region on the outside of the release flow passages 25, or in a low-speed rotation state of the rotating side seal ring 4 at the time of start-up, etc., there is sometimes a case where dynamic pressure for maintaining the sliding faces S of the rotating side seal ring 4 and the stationary side seal ring 7 in a gas lubricating state is insufficient. Thus, in the sliding parts according to the fourth embodiment, the plural dynamic pressure generation mechanisms 36 are provided in the circumferential direction on the sealed fluid side, and a sliding face S is maintained in a fluid lubricating state, so that a friction loss due to sliding is reduced.

In the sliding parts according to the fourth embodiment, effects can also be exerted as well as the third embodiment. That is, in each of the dynamic pressure generation mechanisms 36, until the sliding face is brought into a fluid lubricating state after start-up, a fluid on the sealed fluid side is actively introduced into a fluid introduction portion 34 and the sliding face is lubricated. Thus, it is possible to improve a lubricating property even in a region on the outside of release flow passages 25. In a high-speed rotation state, an extremely shallow groove 35 generates high dynamic pressure (positive pressure). Thus, a slight gap is formed between the sliding faces of a rotating side seal ring 4 and a stationary side seal ring 7, and the sliding faces are brought into a fluid lubricating state, so that it is possible to obtain very low friction. In place of the dynamic pressure generation mechanisms 36 shown in FIG. 7A, the dynamic pressure generation mechanisms 46 of FIG. 7B or the dynamic pressure generation mechanisms 56 of FIG. 7C may be adopted.

Fifth Embodiment

Next, sliding parts according to a fifth embodiment will be described with reference to FIG. 8. In the sliding parts according to the first to fourth embodiments, the fluid leaking in the radial direction from the sealed fluid side to the leakage side is restricted. However, in the sliding parts according to the fifth embodiment, a fluid leaking in the axial direction of sliding faces from the sealed fluid side to the leakage side is restricted.

Figure 8:
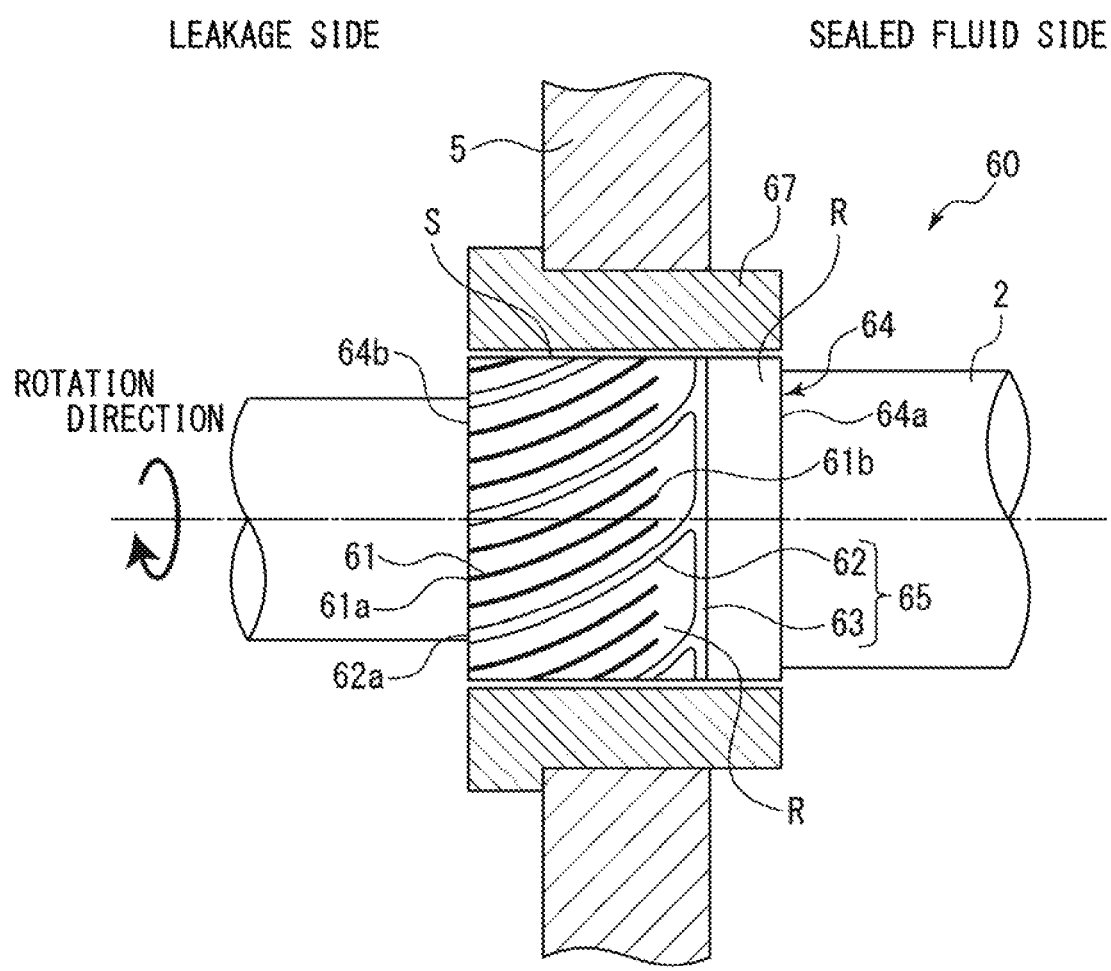
FIG. 8 is a vertically sectional view showing a sliding part according to a fifth embodiment.

As shown in FIG. 8, sliding parts 60 include a cylindrical rotating side seal ring 64 serving as one of the sliding parts provided in a state where the rotating side seal ring is rotatable integrally with a rotating shaft 2, and a cylindrical stationary side seal ring 67 serving as the other sliding part provided in a housing 5 in a non-rotation state. Sliding faces S slide with respect to each other, so that the fluid leaking in the axial direction of the sliding faces is restricted.

The material of the rotating side seal ring 64 and the stationary side seal ring 67 is selected from silicon carbide (SiC) excellent in wear resistance, carbon excellent in self-lubricity, etc. For example, both the seal rings can be made of SiC, or any one of the seal rings made of SiC and the other made of carbon can be combined.

In FIG. 8, the right side of the rotating side seal ring 64 is the sealed fluid side, and the left side is the leakage side. A case where the rotating side seal ring 64 is rotated in the direction shown by an arrow will be described. The sealed fluid side is filled with a liquid such as oil, a gas such as the air, or a mixture (oil mist) of the liquid such as the oil and the gas. The leakage side is filled with a gas such as the air.

The sliding face S of the rotating side seal ring 64 includes plural dynamic pressure generation grooves 61 provided over the entire circumference of the sliding face S, and a release flow passage 65 surrounding the plural dynamic pressure generation grooves 61.

The dynamic pressure generation grooves 61 are extremely shallow band-shaped grooves whose peripheral edges are surrounded by the sliding face S, the grooves being set in a spiral form. One end of each of the dynamic pressure generation grooves is an opening portion 61a open at a leakage side peripheral edge 64b and the other end is closed by a dead-end portion 61b. In a rotation state, the dynamic pressure generation groove 61 suctions the fluid (gas) on the leakage side from the opening portion 61a, pressure is boosted along the dynamic pressure generation groove 61, and the fluid is dammed at the dead end portion 61b, so that high dynamic pressure (positive pressure) is generated. Thereby, the gas on the leakage side suctioned from the opening portion 61a of the dynamic pressure generation groove 61 is pumped toward the sealed fluid side. Thus, leakage of the oil mist on the sealed fluid side to the leakage side is prevented.

The sectional area of the release flow passage 65 is formed to be sufficiently larger than the sectional area of the dynamic pressure generation grooves 61. The release flow passage 65 is mainly formed by a release groove 63 provided between a sealed fluid side peripheral edge 64a and the dead-end portions 61b of the dynamic pressure generation grooves 61, and fluid introduction grooves 62 each of which has a communication portion 62a whose one end communicates with the release groove 63 and the other end is open at the leakage side peripheral edge 64b. The entire release flow passage 65 communicates with the leakage side.

As shown in FIG. 8, a leakage side land portion R between the release groove 63 and the leakage side peripheral edge 64b is divided into plural sections by the plural fluid introduction grooves 62. The predetermined number of (three in the example of FIG. 8) the dynamic pressure generation grooves 61 are arranged in each of the sections. By being arranged in a region surrounded by the release flow passage 65 and the leakage side peripheral edge 64b, the dynamic pressure generation grooves 61 are isolated from the sealed fluid side. Thereby, even when high dynamic pressure is generated by the dynamic pressure generation grooves 61, high dynamic pressure is released to the leakage side by the release flow passage 65, and excessive pumping from the leakage side to the sealed fluid side by the dynamic pressure generation grooves 61 is restricted. Thus, it is possible to prevent excessive supply of the gas from the leakage side to the sealed fluid side.

The sectional area of each flow passage of the release flow passage 65 is formed to be larger than the sum of the flow passage sectional areas of the dynamic pressure generation grooves 61. Thereby, a high-pressure gas pumped by the dynamic pressure generation grooves 61 is reliably reduced by the release flow passage 65, and easily discharged to the leakage side. Thus, excessive pumping from the leakage side to the sealed fluid side is restricted, and hence, it is possible to prevent excessive supply of the gas from the leakage side to the sealed fluid side.

Further, in a land portion R between the sealed fluid side peripheral edge 64a and the release groove 63, the dynamic pressure generation mechanisms 36 of FIG. 7A, the dynamic pressure generation mechanisms 46 of FIG. 7B, or the dynamic pressure generation mechanisms 56 of FIG. 7C may be provided, and the sliding faces S may be maintained in a fluid lubricating state, so that it is possible to reduce a friction loss.

The embodiments of the present invention are described with the drawings above. Specific configurations are not limited to these embodiments but the present invention also includes changes and additions within the range not departing from the gist of the present invention.

For example, in the first to fourth embodiments, the outer peripheral side of the sliding part is described as the high pressure fluid side (sealed fluid side), and the inner peripheral side as the low pressure fluid side (leakage side). However, the present invention is not limited to this but is also applicable to a case where the outer peripheral side of the sliding part is the low pressure fluid side (leakage side) and the inner peripheral side is the high pressure fluid side (sealed fluid side).

REFERENCE SIGNS LIST 2 rotating shaft
4 rotating side seal ring
4a sealed fluid side peripheral edge (one-side peripheral edge of sliding face)
4b leakage side peripheral edge (other-side peripheral edge of sliding face)
7 stationary side seal ring
11 dynamic pressure generation groove
11a opening portion
11b dead-end portion 12 fluid introduction groove
13 release groove
15 release flow passage
21 first groove group
22 second groove group
25 release flow passage
25a opening portion
34 fluid introduction portion
34a sealed fluid side opening portion
35 extremely shallow groove (groove portion)
36 dynamic pressure generation mechanism
44 fluid introduction portion
44a sealed fluid side opening portion
44d sealed fluid side opening portion
45 extremely shallow groove (groove portion)
45b opening portion
45c dead-end portion
46 dynamic pressure generation mechanism
54 fluid introduction portion
54a sealed fluid side opening portion
54e sealed fluid side opening portion
55 extremely shallow groove (groove portion)
55b opening portion
55c dead-end portion
56 dynamic pressure generation mechanism
61 dynamic pressure generation groove
61a opening portion
61b dead-end portion
62 fluid introduction groove
62a communication portion
63 release groove
64 rotating side seal ring
64a sealed fluid side peripheral edge (one-side peripheral edge)
64b leakage side peripheral edge (other-side peripheral edge)
65 release flow passage
67 stationary side seal ring
R land portion
S sliding face

The invention claimed is:

1. A pair of sliding parts having sliding faces that slide with respect to each other, characterized in that at least the sliding face on one side includes:
   fluid introduction grooves each of which has one end communicating with an other-side peripheral edge of the sliding face;
   dynamic pressure generation grooves each of which has one end communicating with the other-side peripheral edge of the sliding face and the other end being surrounded by a land portion; and
   a release groove provided in the land portion, the release groove communicating with the fluid introduction grooves.

2. The sliding parts according to claim 1, characterized in that the release groove is provided between the other ends of the dynamic pressure generation grooves and a one-side peripheral edge of the sliding face.

3. The sliding parts according to claim 2, characterized in that the sliding face includes regions surrounded by the fluid introduction grooves and the release groove, and
   the predetermined number of the dynamic pressure generation grooves are arranged in the regions.

4. The sliding parts according to claim 3, characterized in that the regions are arranged continuously in the circumferential direction.

5. The sliding parts according to claim 3, characterized in that the regions are arranged non-continuously in the circumferential direction.

6. The sliding parts according to claim 2, characterized by further comprising:
   a dynamic pressure generation mechanism including:
   a fluid introduction portion having one end that communicates with the one-side peripheral edge of the sliding face; and
   a groove portion having one end that communicates with the fluid introduction portion and a Rayleigh step mechanism in the other end.

7. The sliding parts according to claim 2, characterized by further comprising:
   a dynamic pressure generation mechanism including:
   a fluid introduction portion having a pair of opening portions open at the one-side peripheral edge of the sliding face and a communication passage providing communication between the pair of opening portions; and
   a groove portion having one end that communicates with the fluid introduction portion and a Rayleigh step mechanism in the other end.

8. The sliding parts according to claim 1, characterized in that the sliding face includes regions surrounded by the fluid introduction grooves and the release groove, and
   the predetermined number of the dynamic pressure generation grooves are arranged in the regions.

9. The sliding parts according to claim 8, characterized in that the regions are arranged continuously in the circumferential direction.

10. The sliding parts according to claim 9, characterized by further comprising:
    a dynamic pressure generation mechanism including:
    a fluid introduction portion having one end that communicates with the one-side peripheral edge of the sliding face; and
    a groove portion having one end that communicates with the fluid introduction portion and a Rayleigh step mechanism in the other end.

11. The sliding components according to claim 9, characterized by further comprising:
    a dynamic pressure generation mechanism including:
    a fluid introduction portion having a pair of opening portions open at the one-side peripheral edge of the sliding face and a communication passage providing communication between the pair of opening portions; and
    a groove portion having one end that communicates with the fluid introduction portion and a Rayleigh step mechanism in the other end.

12. The sliding parts according to claim 8, characterized in that the regions are arranged non-continuously in the circumferential direction.

13. The sliding components according to claim 12, characterized by further comprising:
    a dynamic pressure generation mechanism including:
    a fluid introduction portion having one end that communicates with the one-side peripheral edge of the sliding face; and
    a groove portion having one end that communicates with the fluid introduction portion and a Rayleigh step mechanism in the other end.

14. The sliding components according to claim 12, characterized by further comprising:

a dynamic pressure generation mechanism including:
  a fluid introduction portion having a pair of opening portions open at the one-side peripheral edge of the sliding face and a communication passage providing communication between the pair of opening portions; and
  a groove portion having one end that communicates with the fluid introduction portion and a Rayleigh step mechanism in the other end.

15. The sliding parts according to claim 8, characterized by further comprising:
  a dynamic pressure generation mechanism including:
    a fluid introduction portion having one end that communicates with the one-side peripheral edge of the sliding face; and
    a groove portion having one end that communicates with the fluid introduction portion and a Rayleigh step mechanism in the other end.

16. The sliding components according to claim 8, characterized by further comprising:
  a dynamic pressure generation mechanism including:
    a fluid introduction portion having a pair of opening portions open at the one-side peripheral edge of the sliding face and a communication passage providing communication between the pair of opening portions; and
    a groove portion having one end that communicates with the fluid introduction portion and a Rayleigh step mechanism in the other end.

17. The sliding parts according to claim 1, characterized by further comprising:
  a dynamic pressure generation mechanism including:
    a fluid introduction portion having one end that communicates with the one-side peripheral edge of the sliding face; and
    a groove portion having one end that communicates with the fluid introduction portion and a Rayleigh step mechanism in the other end.

18. The sliding parts according to claim 17, characterized in that the dynamic pressure generation mechanism is provided between the release groove and the one-side peripheral edge of the sliding face.

19. The sliding parts according to claim 1, characterized by further comprising:
  a dynamic pressure generation mechanism including:
    a fluid introduction portion having a pair of opening portions open at the one-side peripheral edge of the sliding face and a communication passage providing communication between the pair of opening portions; and
    a groove portion having one end that communicates with the fluid introduction portion and a Rayleigh step mechanism in the other end.

20. The sliding parts according to claim 19, characterized in that the dynamic pressure generation mechanism is provided between the release groove and the one-side peripheral edge of the sliding face.

* * * * *